United States Patent [19]

Sherman, Jr.

[11] 4,373,676
[45] Feb. 15, 1983

[54] WASTE FOOD DISPOSAL SYSTEM

[75] Inventor: George O. Sherman, Jr., Prairie Village, Kans.

[73] Assignee: Salvajor Company, Kansas City, Mo.

[21] Appl. No.: 209,883

[22] Filed: Nov. 24, 1980

[51] Int. Cl.³ .................... B02C 25/00; B02C 23/36
[52] U.S. Cl. ................................. 241/36; 241/46 A
[58] Field of Search ................ 241/30, 33, 36, 46 R, 241/46 A, 46 B, 100.5, 257 G

[56] References Cited

U.S. PATENT DOCUMENTS

| | | | |
|---|---|---|---|
| 2,244,402 | 6/1941 | Powers | 241/36 X |
| 2,615,636 | 10/1952 | Powers | 241/36 |
| 2,654,540 | 10/1953 | Powers | 241/36 |
| 3,300,150 | 1/1967 | Sones et al. | 241/36 |
| 3,510,069 | 5/1970 | Hanwum | 241/46 R X |
| 3,545,684 | 12/1970 | Ruspino et al. | 241/46 B X |
| 4,034,422 | 7/1977 | Farber et al. | 241/36 X |

*Primary Examiner*—Howard N. Goldberg
*Attorney, Agent, or Firm*—Schmidt, Johnson, Hovey & Williams

[57] ABSTRACT

An improved system, which conserves both energy and water, is provided for disposing of waste materials in environments such as restaurants and institutional food serving facilities. A commercial type food disposer unit having an electric motor for powering a mechanism for grinding or comminuting waste food materials and requiring running water for lubrication, flushing and/or cooling purposes is provided with an electric control circuit for automatically operating the motor and water supply valves associated with the unit in manner assuring both more efficient operation of the unit and minimum usage of electrical power and water. The control circuit of the system employs a plurality of interdependently actuated timer switches, at least certain of which preferably have adjustable length operating periods, in conjunction with various interrelated control relays for iteratively cycling the unit in an improved fashion, not only as to optimizing operation during individual cycles, but also as to iterated usage over a long or continuing period during which the motor is reversed with each successive cycle. When supplied with sources of electrical power and water, the system may be started or reset by simple actuation of a manual start switch, and will then function automatically until stopped by simple actuation of a manual stop switch. Since the disposer unit is operated only intermittently, wear and tear thereon, as well as electrical energy and water, are conserved by the improved system.

9 Claims, 1 Drawing Figure

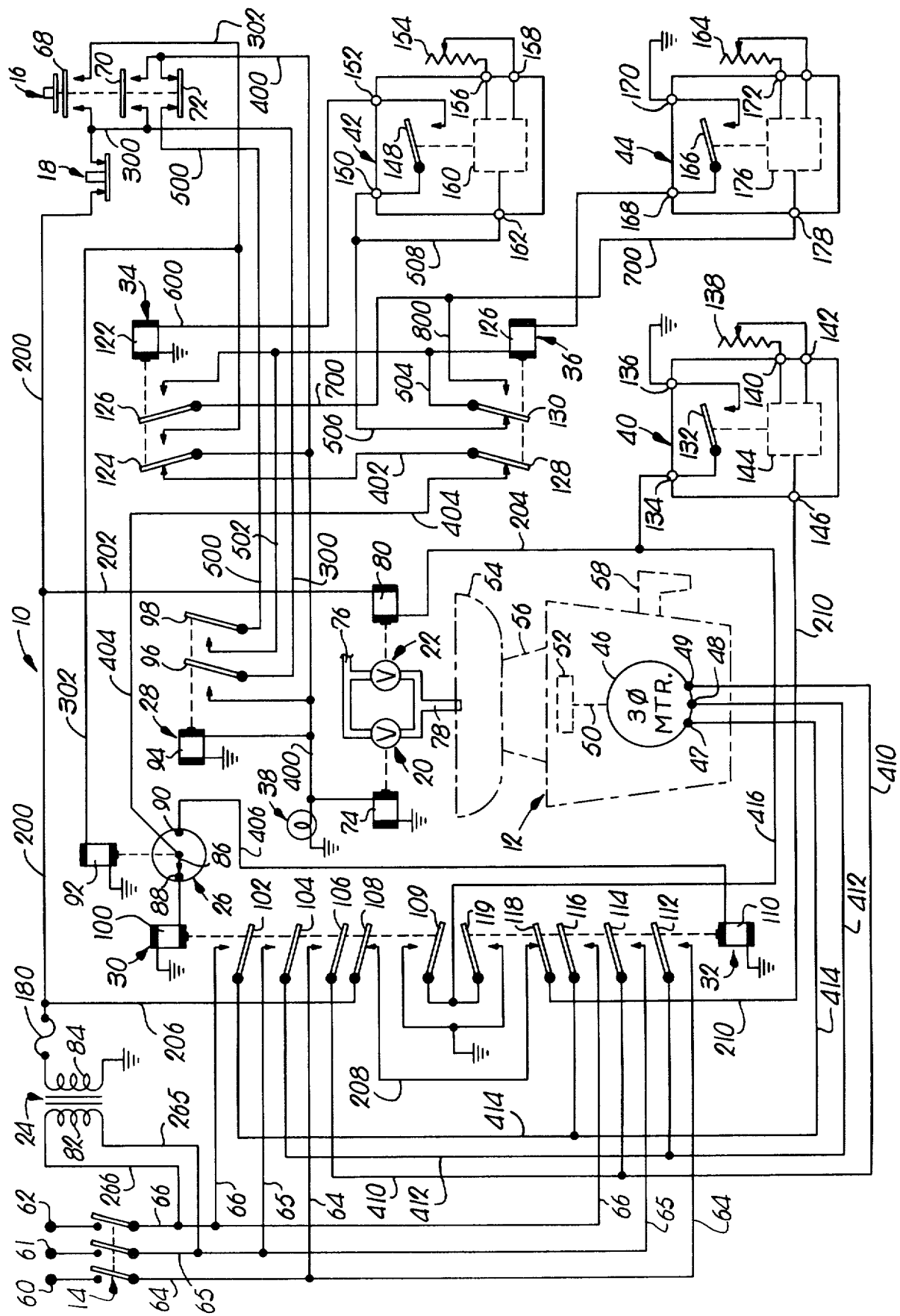

WASTE FOOD DISPOSAL SYSTEM

FIELD OF THE INVENTION

This invention relates to an improved system for disposing of waste materials, especially foods requiring grinding or comminuting prior to discharge by flushing into a sewer or the like; more particularly, the invention is concerned with providing improved, electrical, automatic control apparatus in such systems for the purposes of conserving electrical energy, conserving water, reducing wear and otherwise enhancing the efficiency and reliability of operation of the disposed units employed in such systems, as utilized under practical conditions typically existing in commercial, institutional and similar food serving establishments.

DESCRIPTION OF THE PRIOR ART

In restaurants and other commercial or institutional food serving establishments, provision must be made for disposing of substantial amounts of waste food materials that are left unconsumed by customers or other patrons and must be scraped or otherwise removed from the serving plates and dishes returned to the dish washing area of the establishment for cleaning prior to the next food serving use thereof. In most modern food serving establishments, the use of a garbage can to receive such waste food materials has been supplanted by a waste disposer unit, which typically includes an inlet through which waste foods may be introduced into an internal chamber, a mechanical cutting or grinding mechanism for comminuting food within the chamber, an electric motor of significant size (say, 2 horsepower) for driving the comminuting mechanism, an outlet from the chamber usually coupled with a pipe leading to a sewer for receiving comminuted material discharged from the chamber, and some means for also introducing water into the chamber for "lubricating" the comminuting mechanism, flushing comminuted waste material from the chamber toward the sewer, and cooling the unit.

Systemically, prior installations of such waste disposer units have typically been arranged to be operated or deactivated solely or primarily through the manual actuation of electrical power switches (and, perhaps, water valves), and to essentially be thus manually controlled only between an "On" operating state and an "Off" or deactivated state. Known previous improvements in such manually controlled systems have been largely confined to such individual aspects of operation as assuring the introduction of water during operation of the comminuting mechanism by controlling water flow with a solenoid valve and either energizing the water valve operating solenoid from a circuit controlled by the same manual switch as controls the drive motor for the comminuting mechanism or by otherwise coupling the motor circuit with the valve solenoid circuit (or a manual valve responsive switch) in such manner that the motor circuit cannot be energized unless the valve solenoid circuit is also energized (or the valve is otherwise sensed as having been opened); as permitting reversal of the rotation of the comminuting mechanism during different instances of operation thereof to reduce wear or better clear the chamber of waste materials by providing switching to reverse the direction of energization and running of the motor; etc.

What has previously been lacking in this type of system, however, has been the incorporation of suitable automatic control circuitry for appropriately operating the drive motor for the comminuting mechanism and associated water control valves in a correlated manner best adapted for efficient operation without unnecessary waste of natural resources and wear.

The practicalities of the matter significantly involve the fact that it is not economically feasible for supervisory personnel to remain continuously in the immediate area of a large food serving establishment where waste food scraping and disposal operations are carried out for the purpose of devoting continuing attention to assuring efficient operation of the waste disposer equipment, and the unfortunate circumstance that the personnel typically working in such area as food scrapers or dishwashers are relatively unskilled and either incapable of controlling the operation of mechanical equipment to optimize efficiency or not motivated to do so. Accordingly, with prior waste food disposers that are essentially manually controlled, the prevailing mode of operation has too often been simply to turn the disposer on at the start of the day or shift and then to let it run continuously until it is shut off at the end of the day or shift. Even when unskilled personnel are permitted to activate and deactivate the disposer in accordance with their impression of the need therefor, and attempt to do so, the tendency is for the disposer to be operated for longer periods and more frequent intervals than really required, with consequent significant wastage of both electrical power and water.

What has long been needed in commercial and institutional food serving establishments for waste food disposal purposes, and what has recently become even more sorely needed in view of rising energy costs and a growing shortage of water in many communities, has been, first, a determination of the motor run/rest time and the water flow volume and on/off time parameters (or general ranges thereof), and the sequencing relationships therebetween, that are really needed for efficient operation of waste food disposer units, and secondly, the provision of an integrated system for waste food disposal that includes the disposer unit itself, appropriate water flow controlling components, and suitable electrical control components and circuitry for controlling the disposer unit and the water flow controlling components, both automatically and consistently with the mentioned parameters and relationships. In order that the latter type of system will be adapted for utilization in diverse environments where conditions or demands may vary somewhat, it is desirable that the control portions of the system also provide for reasonable adjustment of at least certain aspects of system operation.

Since no prior waste food disposal equipment of which I am aware has either reliably and effectively avoided the wastage of resources and other disadvantages experienced with essentially manually controlled disposer installations or provided the type of automatic control system I believe to be required for that purpose, that is the problem addressed and, I believe, solved by this invention.

SUMMARY OF THE INVENTION

The automatically controlled waste disposal system provided by this invention, broadly overcomes the above-noted and other disadvantages of prior manually controlled installations for the same general purpose and, more specifically, increases the efficiency, reliability and life of such systems, while reducing wear upon the comminuting mechanism and drive motor of the disposer unit and significantly decreasing the requirements of such systems for electrical energy and water resources.

The improved system employs a disposer unit having a reversible comminuting mechanism and an electrical drive motor therefor, low and higher flow solenoid valves for supplying water to the disposer unit at different rates, and electrical control circuitry including three timer controlled switch units, five relays and an electrically operated reversing switch intercoupled in manner to automatically and iteratively cycle the system through a predetermined sequence of timed operating phases for achieving the above-mentioned objects of the invention without further user attention once the system is provided with electrical power and started. Constructional features regarded as of particular significance in best implementing the over-all control portion of the system include the employment of solid state, electronic type timer controlled switch units of the kind permitting convenient adjustment of their operating periods merely through appropriate setting of variable resistances associated therewith. Further important details concerning the electrical intercouplings and operational relationships between the various components of the improved system will be explained hereinafter with reference to a currently preferred embodiment of the invention.

BRIEF DESCRIPTION OF THE DRAWING

In the accompanying drawing, the single, unnumbered FIGURE thereof is a schematic diagram of a currently preferred, illustrative embodiment of the improved disposal system for waste food materials provided by the invention.

DESCRIPTION OF THE PREFERRED EMBODIMENT

The currently preferred embodiment of my improved waste food disposal system, by which the principles of the invention may be illustrated, may be most conveniently explained by initially identifying and describing the nature of the various components employed in such exemplary embodiment, and then noting the physical intercouplings and operational relationships between such components in the general context of the different phases of a typical operational sequence.

Accordingly, referring to the schematic depiction of the mentioned embodiment of the invention in the accompanying drawing, my improved system is generally designated by the reference numeral 10, and will be seen to broadly include a disposer unit 12, a main electrical circuit breaker 14, a start switch 16, a stop switch 18, a solenoid controlled, low flow rate, water valve 20, a solenoid controlled, higher flow rate, water valve 22, an electrical transformer 24, an electrically responsive, reversing switch 26, a master relay 28, a pair of alternately actuatable power relays 30 and 32, a pair of control relays 34 and 36, at least one condition indicator as at 38, three solid state, electronically timed, switch units 40, 42 and 44, and various electrical and water flow couplings hereinafter identified.

The disposer unit 12 may be any of a number of products that are available on the market for use in disposing of waste foods on a commercial quantity basis, my preference being a disposer unit of the type available from The Salvajor Company of Kanas City, Miss. under the trademark "Salvajor" and in models of various sizes to accommodate to the requirements of installation in various particular environments. Such a disposer unit 12 will typically include a 3-phase, alternating current, drive motor 46 having power terminals 47, 48 and 49, which may range in size from about one horsepower up to about 7½ horsepower depending upon the quantity of waste material to be handled in a particular installation. The motor 46 is inherently reversible in its direction of operation, depending upon the manner in which the power terminals 47, 48 and 49 are energized from a 3-phase power source. The motor 46 will be mechanically coupled, as indicated schematically by the dotted line 50 in the drawing, with any conventional type of mechanism 52 internal to the unit 12 and adapted by cutting, grinding or other such action to comminute waste materials fed thereto. The mechanism 52 will conventionally also be operable in either direction of rotation thereof and will be lubricated and cooled by water fed thereto along with the waste material to be comminuted. The unit 12 is typically provided with some form of inlet receptacle 54, which may be installed in or form a part of a sink-like facility of the installation into which waste materials and water are to be introduced. The receptacle 54 typically communicates with a portion of the interior of the unit 12 containing the comminuting mechanism 52 via a neck 56, and such internal portion of the unit 12 communicates with a discharge outlet 58 which is, in turn, adapted to discharge comminuted waste material and water into a sewer system or the like.

The main electrical circuit breaker 14 may be of conventional type and will preferably either incorporate overload protection or have suitable fuses associated therewith. The circuit breaker 14 is adapted for coupling with any suitable source of 3-phase, alternating current electrical power represented in the drawing by terminals 60, 61 and 62, and is oppositely connected with the main 3-phase power leads 64, 65 and 66 of the system 10. The circuit breaker 14 may be used for normal activation and deactivation of the entire system 10, or for emergency type deactivation thereof if that should become appropriate, and will typically be located so as to be accessible within the same general area of the installation as that in which the disposer unit 12 is located. It should be understood, however, that the circuit breaker 14 will not normally be operated between its on and off conditions during a given shift or day, but rather will simply be closed to provide electrical energization for the system 10 at the beginning of the day or other operating period for the system 10 and will then be opened at the end of such period to remove electrical energization from the system 10 during periods that the restaurant, institutional kitchen or the like in which the system 10 is installed will not be operating.

The start switch 16 and the stop switch 18 are both preferably of the push-button type and, in the preferred type of installation, will be either so located or so housed as to restrict access thereto for operation thereof to management or other authorized personnel, rather then being intended for arbitrary manipulation during a working shift or day by personnel who are essentially responsible only for scraping or washing dishes or the like. The stop switch 18 is essentially of the normally closed, single pole, single throw type and will remain closed except during periods when it may be manually actuated into an open position thereof. The start switch 16 has three ganged electrical switches whose pole pieces are further identified by the reference numerals 68, 70 and 72 that are all adapted to be operated in the manner next described when the start switch 16 is manually actuated. The switch 68 is normally open, but is of the "early make" type configured to close when the start switch 16 is pushed or otherwise actuated before the electrical condition of either of the other switches 70 and 72 is altered. The switch 70 is of the normally open type and is configured to close during actuation of the start switch 16, but to do so at a time momentarily later than the closing of the early make switch 68. The switch 72 is of the normally closed type and is adapted to be opened during actuation of the start switch 16 more or less concurrently with the closing of the switch 70 and at a time momentarily later than closing of the early make switch 68. Upon deactuation of the start switch 16 through removal of manual pressure therefrom or otherwise, the condition of the switches 68, 70 and 72 is altered in a sense opposite to that described for actuation of the start switch 16, namely, the switch 72 will reclose and the switch 70 will open, and then momentarily later the switch 68 will also reopen. As will be apparent from the drawing, each of the switches 68, 70 and 72 of the start switch 16 is of essentially the single pole, single throw variety adapted to establish or interrupt the continuity of a corresponding single circuit in series with which each of such switches 68, 70 and 72 is interposed.

The water valve 20 is of the electrically controlled type having associated therewith a solenoid 74 in such manner that the valve 20 will be opened for the passage of water therethrough whenever the solenoid 74 is electrically energized. The inlet of the valve 20 is adapted for coupling via inlet piping 76 with a source of water under pressure such as an ordinary water main. The outlet of the valve 20 communicates with piping as at 78 for delivering the water passing through the valve 20 to the portion of the unit 12 containing the mechanism 52, which will typically be via the receptacle 54 and the inlet structure 56 of the unit 12. The valve 20 is selected to permit the passage of only a limited flow of water therethrough when it is opened, such as about one gallon per minute, so that the valve 20 may be referred to as the low flow rate valve and it will be understood is operationally associated with the function of providing a very limited flow of water to the unit 12 on a substantially continuing basis during periods when the system 10 is operating for purposes of lubrication and cooling of internal parts of the unit 12, as well as to supply a needed water content to waste materials being fed to the receptacle 54 during intervals between the periods that active operation of the motor 46 and the mechanism 52 are actually needed or occurring as a part of the controlled operating cycle of the system 10.

Similarly, the valve 22 is of the electrically responsive type having an operating solenoid 80 associated therewith. The inlet of the valve 22 is also adapted for coupling with a water main or other source of water under pressure via the piping 76 and has its outlet coupled with the piping 78 for directing water passing therethrough to the unit 12 typically via the receptacle 54. As will become more apparent during the subsequent discussion of operation, however, the valve 22 is adapted when open to pass a much higher rate of flow water than the valve 20 and may be referred to as the high flow rate valve. The valve 22 should be selected to have when open a water flow rate compatible with the size of the disposer unit 12 being used in the particular installation and with the amount of waste materials expected to be handled, but typically may provide a water flow of about 5 gallons per minute in the type of installation that would be appropriate for an ordinary size commercial restaurant.

The electrical transformer 24 has a primary winding 82 and a secondary winding 84 and serves to isolate the control circuitry portions of the system 10 from direct connection with the main power leads 64, 65 and 66. As will be apparent to those skilled in the art, the transformer 24 may be selected to provide at the secondary winding 84 thereof an electrical output of reduced voltage level, if that should be desired for any reason, in which case the other electrically operated control components of the system 10 should be selected to be consistent with and operate from whatever voltage would be supplied thereto from the secondary winding 84 of the transformer 24; since the control related components of the system 10 will preferably be contained within some suitable form of protective housing (not shown), and since any electrical connections that might otherwise be outside of such housing will presumably be made by means of cabling having appropriate protective characteristics for the environment of installation, however, there is no inherent reason why the control portions of the system 10 may not be operated at a standard, single-phase, alternating current level, such as a nominal 110 volts, which is convenient from the standpoint of the various relays, solenoids and the like utilized by the control portions of the system 10 then being readily and economically available. As those skilled in the art will also readily perceive, the function of the transformer 24 is primarily to provide a supply of single phase, alternating current, electrical power of suitable level, such as 110 volts, for operating the control portions of the system 10, while deriving such power from what will typically be a 3-phase type alternating current, power source 60, 61 and 62, involving higher overall voltage levels, such as 240 volts, so that the transformer 24 may be selected to be from among any of the types commonly available for serving that purpose; for simplicity in the drawing, the transformer 24 is illustratively depicted as having merely a single phase type primary winding 82 coupled across one phase 65, 66 of the main power leads 64, 65 and 66, although it will be apparent that a transformer 24 having a more complex primary winding arrangement adapted for coupling with all three of the 3-phase main power leads 64, 65 and 66 could be utilized, if desired, although it is observed that the power supplied by the secondary of the transformer 24 will preferably be of the single phase type adapted for operating the control portion of the system 10 without undue complication of the latter.

The reversing switch 26 is essentially of the single pole, double throw type and is adapted to "alternate" the state of contacting engagement of its pole 86 between a pair of alternate contacts 88 and 90 in response to successive actuations of an associated solenoid or coil 92. Various types of conventional components may be employed for the reversing switch 26, my preference being a reversing relay of the type available from Potter and Brumfield of Princeton, Ind. under the trademark "AMF" and as Model 6510 in which each successive energization of the coil 92 shifts an over-center biased pole 86 into contact with the contacts 88 and 90 alternately.

The master relay 28 is an ordinary control relay component having an operating coil 94 and a pair of associated, normally open, single pole, single throw type relay switches 96 and 98.

The power relays 30 and 32 may be implemented with similar components widely available from various commercial sources. The relay 30 has an operating coil 100; associated, normally open, single pole, single throw type, power relay switches 102, 104 and 106 adapted to handle the level of current required for operation of the motor 46 of the disposer unit 12; an associated, normally closed, single pole, single throw type, control, relay switch 108; and an associated normally open, single pole, single throw type, control, relay switch 109. Similarly, the relay 32 has an operating coil 110; normally open, power switches 112, 114 and 116; normally closed control switch 118; and normally open control switch 119.

The control relays 34 and 36 also may be implemented with conventional components widely available from various commercial sources, but utilize somewhat differing types of switch arrangements. The relay 34 has an operating coil 120; an associated, single pole, double throw type, control, relay switch 122; and an associated, normally open, single pole, single throw type, control relay switch 124. The relay 36 has an operating coil 126; an associated, normally closed, single pole, single throw type, control, relay switch 128; and an associated, single pole, double throw type, control, relay switch 130.

The indicator 38 may be an incandescent bulb, a light emitting diode or the like and is intended as illustrative of the amenability of the control portion of the system 10 to the possible employment of similar indicators at various points in the circuitry to indicate when the system 10 is in various conditions or phases of operation thereof. The indicator 38 specifically depicted in the drawing is associated with the coil 94 of the master relay 28 and electrically coupled in parallel therewith, so that an energized state of the indicator 38 will provide visual confirmation that the control portion of the system 10 is energized as required during its normal operating cycle; conversely, as will subsequently become more apparent, deactivation of the indicator 38 upon actuation of the stop switch 18 will confirm the effectiveness of the latter as having successfully deenergized the master relay 28 to interrupt the normal cycle operation of the control portion of the system 10.

The timed switch units 40, 42 and 44 of my preferred construction for the system 10 are significantly implemented with solid state, electronic timer components of a type permitting their operating periods to be suitably accommodated to the particular installation in which the system 10 is to be employed, as well as being accurate, space saving and energy conserving, my specific preference being to use timer switch components of the "TS" Series type available from SSAC, Inc. of Liverpool, N.Y., under the trademark "VERSA-TIMER", which are marketed in models providing either normally open, immediate closure, timed reopening, switching operation (e.g., Model TS 1424) or normally closed, immediate opening, timed reclosure, switching operation (e.g., Model TS 2424). Since the details of the solid state circuitry employed within such components by the manufacturer thereof do not per se constitute a part of my invention, the units 40, 42 and 44 are schematically depicted in the accompanying drawing in manner intended to emphasize only those operational and interfacing characteristics of same which are most germane to the advantageous employment of such components in my system 10 (although those skilled in the art will understand that the switching, timing and internal control means included in each of the units 40, 42 and 44 are implemented with solid state electronics).

The timer switch unit 40 effectively provides a normally open internal circuit path represented by the open switch symbol 132 between terminals 134 and 136, which switched path 132 is adapted to be closed for a timed period determined by the value of a resistance 138 connected between terminals 140 and 142 and then automatically reopened under the control of an internal electronic timing module 144 whose operating cycle is initiated whenever a triggering electrical energization signal is applied to a control terminal 146. The resistance 138 is preferably of the variable type, such as a rheostat or any equivalent thereof, so that the timed period of controlled closure of the switched path 132 between terminals 134 and 136 may be adjusted to a length appropriate to the particular installation, my preference being about 45 seconds (requiring a resistance adjusted to about 390 K ohms when the above recommended timer switch component is employed, so that a 500 K ohms rheostat may conveniently be used as the resistance 138 to provide the extent of adjustability that typically may be desired). The timing control means 144 of the switch unit 40 will be observed to be adapted to respond to triggering signals of the alternating current type applied to the terminal 146, rather than requiring a direct current or other special type of control input that would tend to complicate the control portion of the system 10.

The timer switch unit 42 is similar to the switch unit 40, except that the switched path represented by the closed switch symbol 148 in the unit 42 is normally closed to provide continuity between terminals 150 and 152, but is adapted to be opened for a timed period determined by the value of a resistance 154 connected between terminals 156 and 158 and then automatically reclosed under the control of an internal electronic timing module 160 whose operating cycle is initiated whenever a triggering electrical energization signal is applied to a control terminal 162. In the unit 42, the electrical interconnection between the switch terminal 159 and the control terminal 162 may actually be internal to the unit 42 (although, perhaps redundantly, depicted in the drawing as external for the sake of general consistency with the schematic representation chosen for the units 40 and 44). As will be subsequently further explained, the timed opening of the switched path 148 of the unit 42 essentially determines the length of intermittent periods of automatically cycled operation of the motor 46 of the disposer unit 12 and the high rate water flow valve 22, for which I prefer a period of length that will be adjustable for best accommodating to each particular installation (but with about 5 minutes being typically appropriate for an ordinary size commercial restaurant). Accordingly, the resistance 154 will preferably be variable, such as a rheostat, and with the previously recommended timer component may have a range up to about, say, 3 megohms in order to provide operating periods for the disposer unit 12 of about 5 minutes duration with a setting of the rheostat 154 to a value of about 2.4 megohms.

The timer switch unit 44 is of the normally open, switched path type and is essentially identical to the previously described unit 40, except that the rheostat or variable resistance 164 associated with the unit 44 (which controls the length of the intervals between periods of automatically cycled operation of the disposer unit 12 and water valve 22) should have a range appropriately permitting a setting of about 4.7 megohms to provide for such intervals to be about 10 minutes long with the previously recommended timer component, which I prefer for typical installations in ordinary size restaurants. In the unit 44, the switched path is identified as 166, the switched path terminals at 168 and 170, the rheostat terminals as 172 and 174, the electronic timer module as 176, and the control terminal for receiving a triggering signal as 178.

Having thus identified and noted the nature of the primary components employed in the preferred embodiment of the system 10 being described to explain and illustrate my invention, the physical couplings and operational relationships between such components may next be conveniently considered in the context of the various phases of the normal operation of the system 10.

The drawing shows the system 10 in its off or deenergized condition, as it typically would be when shut down by opening of the main circuit breaker 14 during intervals between the operating hours of the establishment in which the system 10 in installed. In such off condition of the system 10 with the circuit breaker 14 open, all of the electrical components of the system 10 will be deenergized and the various switching components will be in the states depicted in the drawing.

The system 10 is activated, as at the time of opening for business or operation of the establishment in which it is installed, by manual closing of the circuit breaker 14, which will then typically remain closed until reopened to deactivate the system 10 at the end of the business or operational day of such establishment.

Closure of the circuit breaker 14 energizes the main power leads 64, 65 and 66, but this has no immediate effect upon the motor 46 of the disposer unit 12, which remains deenergized by virtue of the normally open state of the relay switches 102, 104, 106, 112, 114 and 116. However, energization of the main power leads 65 and 66 (and 64, if the transformer 24 employs a 3-phase primary) energizes the primary winding 82 of the transformer 24 through leads 265 and 266. This presents a control supply voltage across the secondary winding 84 of the transformer 24, which is oppositely coupled with a conductive means represented as a common ground by the usual symbol in the drawing and, preferably through a suitable fuse 180, with a control power lead 200. Although the normally closed state of the stop switch 18 extends the energization from the power lead 200 to one side of each of the switches 68 and 70 of the start switch 16 and switch 96 of the master relay 28, this is of no immediate effect by virtue of the normally open state of the switches 68, 70 and 96. Such initial energization of the power lead 200 does, however, have two immediate effects. First, energization is supplied to one side of the operating solenoid 80 for the high flow rate water valve 22 via the lead 202 from the power lead 200, so that the solenoid 80 is readied for operating the valve 22 as soon as a circuit path from the other side thereof may be established to the common ground (note that, by virtue of the normally open state of the control switches 109 and 119 of the reversing relays 100 and 110 respectively, which both remain deenergized at this time, establishment of a path to ground from the solenoid 80 would need to be created via lead 204 to terminal 134 of the timer unit 40 and thence to the grounded terminal 136 of the latter through the normally open switched path 132 of the unit 40). Secondly, a triggering signal is applied to the control terminal 146 of the timer unit 40 via a path traceable from the power lead 200, through lead 206, normally closed switch 108 of relay 100, lead 208, normally closed switch 118 of relay 110, and lead 210.

Upon the triggering of the timer switch unit 40 in the manner just referred to, the timing and control means 144 of the unit promptly closes the switched path 132 of the unit 40 and then maintains the same closed for a period of time (say, 45 seconds) determined by the value to which the resistance 138 has been set, at the end of which the timing and control means 144 automatically reopens the switched path 132 (even though the voltage previously applied to the control terminal 146 as a triggering signal may still be present thereat). During the period that the switched path 132 of the unit 40 is closed, it completes an energizing circuit for the high flow rate water valve solenoid 22 traceable from the power lead 200 via lead 202 to the solenoid 80, through the latter and via lead 204 to the terminal 134 of the timer unit 40, thence through the closed switched path 132 to the grounded terminal 136 of the unit 40. During such energization of the solenoid 80, it opens the high flow rate valve 22 permitting water from the source piping 76 to run via piping 78 into the disposer unit 12 to flush and lubricate the waste comminuting mechanism 52 and the internal waste handling portion of the disposer unit 12 drained via the outlet 58. This initial introduction of water to the disposer unit 12 before commencement of regular operation of the latter is desirable to minimize wear by avoiding any possibility of starting the motor 46 with the mechanism 52 in a dry condition. After the period determined by the resistance 138, the timer unit 40 automatically reopens its switched path 132, thereby deenergizing the solenoid 80 and reclosing the water valve 22.

The normal cycle of automatic operation of the system 10 is then activated by brief, manual actuation of the start switch 16. The first thing which occurs upon the application of actuating pressure to the start switch assembly 16 is that the normally open, early make switch 68 closes (with the switch 70 still momentarily remaining open and the switch 72 still momentarily remaining closed). In this condition of the system 10, since the master relay 28 and the control relay 34 remain unactuated with their associated switches in the states illustrated in the drawing, the only immediate effect of closing of the early make switch 68 is to apply an energizing voltage to the operating coil 92 of the reversing switch 26, which shifts the switch pole 86 of the latter into contact with the other of the contacts 88 and 90 from the one it had previously been contacting (i.e., into contact with the contact 90, presuming the previous state of the switch 26 illustrated in the drawing). The mentioned circuit for thus energizing the coil 92 to operate the reversing switch 26 may be traced from the power lead 200, through the closed stop switch 78, lead 300, the closed early make switch 68 and lead 302 to the oppositely grounded coil 92. It may be observed that, upon subsequent release of actuating pressure from the start switch 16 and consequent reopening of the early make switch 68, the circuit just traced for initially energizing the coil 92 through the early make switch 68 will be interrupted and remain open during subsequent, normal, automatically cycled operation of the system 10; an alternate circuit path for later energizations of the coil 92 to effect further reversals of the switch 26 during normal cycled operation of the system 10 will be hereinafter described.

As the application of manual actuating pressure to the start switch 16 is continued in normal fashion, but momentarily after the previously discussed closing of the early make switch 68, the normally open switch 70 closes and the normally closed switch 72 opens. The last-mentioned changes of state of the switches 70 and 72, although temporary and lasting only during the brief period of manual actuation of the start switch 16, have significant effects in initiating the automatically cycled operation of the system 10 that will thereafter continue until either the stop switch 18 or the main circuit breaker 14 is opened.

Closing of the switch 70 completes a circuit traceable from the power lead 200, through the closed stop switch 18, lead 300, closed switch 70 and lead 400 for commencing energization of the oppositely grounded coil 94 of the master relay 28, the oppositely grounded operating solenoid 74 for the low rate water valve 20, and the oppositely grounded indicator 38. Energization of coil 94 actuates the master relay 28 and closes both of its associated, normally open, relay switches 96 and 98. Although the concurrently opened condition of switch 72 of the start switch assembly 16 renders the closing of relay switch 98 momentarily irrelevant, the closing of the relay switch 96 has the important effect of establishing a holding circuit for the coil 94 of the master relay 28 traceable from the power lead 200, through the closed stop switch 18, lead 300, closed relay switch 96 and lead 400 to the coil 94 (as well as to solenoid 74 and indicator 38). It will be noted that the holding circuit just traced does not pass through any of the switches 68, 70 or 72 of the start switch assembly 16, and in fact passes only through the normally closed, manual stop switch 18 and the holding switch 96 of the master relay 28. Accordingly, once the master relay 28 has been actuated by initial actuation of the start switch 16, it will remain so actuated throughout normal cycled operation of the system 10 until either the stop switch 18 or the main circuit breaker 14 is manually opened. One side effect of this, from the standpoint of convenience of reference to the drawing, is that, once the master relay 28 has been thus actuated at the outset of commencing normal cycled operation of the system 10, and absent opening of the stop switch 18, the leads 300 and 400 become essentially extensions of the power lead 200 and remain continuously energized throughout normal cycled operation of the system 10.

The primary result of such actuation of the master relay 28 and energization of the lead 400 is the completion of a circuit for actuating one or the other of the operating coils 100 or 110 of the power relays 30 or 32 respectively. With the pole 86 of the reversing switch 26 assumed to now be contacting the contact 90, the coil 110 of the power relay 32 would be energized to actuate the latter through a circuit traceable from the power extension lead 400, through the pole and normally closed contact of the double throw relay switch 124 of the control relay 34, lead 402, the normally closed single throw relay switch 128 of the control relay 36, lead 404, pole 86 and contact 90 of the reversing switch 26, and lead 406 to the oppositely grounded operating coil 110 of the power relay 32 (if the pole 86 of the reversing switch 26 had been contacting the contact 88 of the latter, the corresponding circuit for energizing the operating coil 100 of the power relay 30 would have been the same as just traced up to the pole 86 of the reversing switch 26, but then from contact 88 of the latter via lead 408 to the oppositely grounded operating coil 100 for actuating the power relay 30, instead of the power relay 32 being actuated). Such actuation of the power relay 32 changes the state of all of its associated switches 112, 114, 116, 118 and 119. Closing of the switches 112, 114 and 116 supplies 3-phase operating power to the terminals 47, 48 and 49 of the motor 46 to commence operation of the latter and the mechanism 52 of the disposer unit 12 driven thereby in one direction. The three circuits effecting the last-mentioned connection of 3-phase power to the motor 46 may be respectively traced as follows: first, from the main power lead 64, through the now closed switch 112 of the power relay 32 and lead 412 to the motor terminal 48; secondly, from the main power lead 65, through the now closed switch 114 of the power relay 32 and lead 410 to the motor terminal 47; and thirdly, from the main power lead 66, through the now closed switch 116 of the power relay 32 to the motor terminal 49. Note that such connection of 3-phase power to the motor 46 by actuation of the power relay 32 will result in operation of the motor 46 and mechanism 52 in one direction, whereas energization of the motor 46 by actuation of the power relay 30 (as occurs during alternate cycles of automatic operation of the system 10) would have caused the motor 46 and mechanism 52 to be operated in the opposite direction by virtue of the corresponding motor energizing circuits associated with the power relay 30 being traceable as follows: first, from the main power lead 64, through the then closed switch 106 of the power relay 30 and lead 410 to motor terminal 49; secondly, from the main power lead 65, through the then closed switch 104 of the power relay 30 and lead 412 to motor terminal 48; and thirdly, from the main power lead 66, through the then closed switch 102 of the power relay 30 and lead 414 to the motor terminal 47. Since the direction of operation of the 3-phase motor 46 depends upon the manner in which its terminals 47, 48 and 49 are connected with the power leads 64, 65 and 66 of the 3-phase operating power supply, it will be apparent that the desired reversal of the direction of operation of the motor 46 and the mechanism 52 depending upon which of the power relays 30 or 32 is actuated at the time, is provided by the noted differences in the connections between the main power leads 64, 65 and 66 and the motor terminals 47, 48 and 49 effected by the switches 112, 114 and 116 of the power relay 32 and those effected by the switches 102, 104 and 106 of the power relay 30.

Actuation of the power relay 32 opens the associated, normally closed switch 118, thereby removing the triggering signal that had earlier been applied to the control terminal 146 of the timer unit 40, and it will be noted that the switch 108 of the power relay 30 serves a similar function of interrupting the previously traced triggering signal circuit to the control terminal 146 of the timer unit 40 when the power relay 30 is activated first upon daily start-up of the system 10 as herein described.

A further, very significant result of the actuation of the power relay 32 occurs from the closing of its associated, normally open relay switch 119. The closing of the switch 119 establishes an alternate path to ground for the solenoid 80 of the high flow rate water valve 22, which is traceable from the power lead 200, through lead 202, the solenoid 80, lead 204, lead 416 and the now closed switch 119 of the power relay 32 to ground. As will be apparent and may now conveniently also be noted, the switch 109 associated with the power relay 30 performs the same function through an otherwise identically traceable circuit when the power relay 30, rather than the power relay 32, is in actuated condition. Thus, during any periods that the motor 46 of the disposer unit 12 is being operated in either direction (depending upon which of the power relays 30 or 32 is actuated at the time), the solenoid 80 will also be and remain energized to maintain the high flow rate water valve 22 open during such period, so that water will be flowing at the needed substantial rate through the piping 76 and 78 to the disposer unit 12 whose mechanism 52 is then actively engaged in comminuting accumulated waste materials that have accumulated or are being introduced and which will then be flushed by such flow of water to a sewer or the like via the outlet 58 of the unit 12. It will be observed that it is convenient to permit the solenoid 74 to remain energized and the low flow rate water valve 20 to also remain open during such periods of active operation of the disposer unit 12, and this should be taken into account in selecting the flow capacity for the valve 22 in any particular installation.

Other, also functionally significant consequences of actuation of the master relay 28 and energization of lead 400 are that the indicator 38 will remain energized to advise that cycled operation of the system 10 has been initiated or is continuing, and that the solenoid 74 will be energized and so maintained throughout normal cycled operation of the system 10 to hold the low flow rate water valve 20 open to permit a continuing "trickle" flow of water from the supply piping 76 and through the piping 78 to the disposer unit 12, which is desirable even during intervals between periods of timed automatic activation of the motor 46 and the mechanism 52 for lubricating and cooling purposes and to assure the presence of at least some water in connection with the continued introduction of waste materials during such intervals.

The above-described actuation and "locking in" of the master relay 28 and the mentioned resulting effects occur almost instantaneously upon closing of the normally open switch 70 of the start switch assembly 16 and during the time involved in normal pressing actuation of the latter. The next functionally significant event will be the release of manual actuating pressure from the start switch assembly 16, which initially results in the reopening of switch 70 and the reclosing of switch 72 (the early make switch 68 momentarily still remaining closed). Such reopening of switch 70 has no immediately significant effect, since the "holding circuit" path between leads 300 and 400 rendering them extensions of the power lead 200 has already been established, and the reopening of the switch 70 merely interrupts what has become a redundant path therebetween. Reclosing of the switch 72, however, has two significant consequences. First, although the coil 126 of the control relay 36 cannot yet be energized for lack of an opposite grounding connection until the switched path 166 of the timer unit 44 is closed, a partial energizing circuit for the coil 126 is completed from the power extension lead 400, through reclosed switch 72, lead 500, closed relay switch 98 of the master relay 28 and lead 502 connected with one side of the coil 126, which is thereby readied for energization as soon as its other side is provided with a connection to ground. Secondly, reclosing of the switch 72 establishes, as an extending branch of the partial circuit just traced, a connection via lead 504, the pole and normally closed contact of the double throw relay switch 130 of the control relay 36, lead 506 and lead (or internal connection) 508 to the control terminal 162 of the timer unit 42, thereby applying a triggering signal to the latter. Application of such triggering signal to the control terminal 162 of the timer unit 42 results in immediate opening of the switched path 148 of the timer unit 42 by the timing and control means 160 thereof, and marks the commencement of the period during which the timer unit 42 will permit the motor 46 of the disposer unit 12 and the high flow rate water valve 22 to operate during the then current energization thereof. Note that opening of switched path 148 prevents energization of the operating coil 122 of the control relay 34, which must remain in its unactuated condition for continuance of the desired period of current operation of the motor 46 and water valve 22 (by virtue of the dependence of the latter upon continued maintenance of the previously traced energizing circuit for the power relay 32 passing through contacts of the relay switch 124 of the control relay 34 that are closed only when the control relay 34 is unactuated).

The final effect of release of manual operating pressure from the start switch assembly 16 will be the reopening of its associated early make switch 68, the primary effect of which will be to remove the energization theretofore briefly applied to lead 302 and the operating coil 92 of the reversing switch 26 during actuation of the start switch assembly 16, thereby readying the reversing switch 26 and its coil 92 for the next energization and operation thereof during a subsequent phase of the normal automatic operating cycle of the system 10, as hereinafter explained.

Meanwhile, actuation of the start switch assembly 16 has resulted in initiation of the first phase of automatically controlled and cycled operation of the system 10 in which the motor 46 and mechanism 52 of the disposer unit 12 are being operated in a direction corresponding to actuation of the power relay 32, the high flow rate water valve 22 is being maintained open by its operating solenoid 80, and the timing cycle of the timer unit 42 has been started. At the end of the time period determined by the setting or value of the resistance 154 associated with the timer unit 42 (say, 5 minutes), the timing and control means 160 of the latter will automatically reclose the switched path 148 of the timer unit 52, which terminates the first active operation phase of the automatic operating cycle of the system 10 and initiates a timed, inactive, resource conserving phase of such cycle in the manner next described.

Reclosing of the switched path 148 of the timer unit 42 completes a circuit for energizing the operating coil 122 of the control relay 34 to actuate the latter, which is traceable from the power extension lead 400, through the now reclosed switch 72 of the start switch assembly 16, lead 500, closed relay switch 98 of the master relay 28, lead 502, lead 504, the still closed contacts of relay switch 130 of the control relay 36, lead 506, the now reclosed switched path 148 of the timer unit 42, and lead 600 to the oppositely grounded operating coil 122 of the control relay 34. Actuation of the control relay 34 changes the state of each of its associated relay switches 124 and 126.

Thus changing the state of the relay switch 124 of the control relay 34 has two effects. First, the previously traced circuit through such switch 124 for energizing the operating coil 110 of the power relay 32 (or the operating coil 100 of the power relay 30, as the case may be) is interrupted, resulting in deenergization and deactuation thereof. Deactuation of, for instance, the power relay 32 results in reopening of its main power handling relay switches 112, 114 and 116, thereby deenergizing the motor 46 of the disposer unit 12, and in reopening of its relay switch 119, thereby deenergizing the solenoid 80 and closing the high flow rate water valve 22. These actions place the disposer unit 12 in its inactive, resource conserving condition, during which waste materials may accumulate in the receptacle 54 for processing during the next period of active operation of the motor 46. Secondly, changing the state of the relay switch 124 of the control relay 34 establishes a path for energizing the operating coil 92 of the reversing switch 62 to actuate the latter to move its pole 86 into contact with the other contact 88 (or 90, as the case may be) thereof, which circuit is traceable from the power extension lead 400 through the actuated relay switch 124 and the lead 302 to the oppositely grounded operating coil 92 of the switch 26.

Actuation of the relay switch 126 of the control relay 34 establishes a circuit for applying a triggering signal to the control terminal 178 of the timer unit 44, which is traceable from the power extension lead 400, through the closed switch 72 of the start switch assembly 16, lead 500, closed relay switch 98 of the master relay 28, lead 502, the now closed relay switch 126 of the control relay 34, and lead 700 to the control terminal 178 of the timer unit 44. Such triggering signal applied to the control terminal 178 causes the timing and control means 176 of the timer unit 44 to immediately close the switched path 166 thereof and to commence the timing of an interval of length (say, 10 minutes) determined by the setting or value of the associated resistance 164.

The closing of the switched path 166 of the timer unit 44 completes a circuit path to ground for the operating coil 126 of the control relay 36, which is being oppositely energized via lead 502 and the circuit previously traced in that regard, which results in deactuation of the control relay 36 and a reversal of state of its associated relay switches 128 and 130.

Such reversal of state of the relay switch 128 of the control relay 36 provides a further series interruption between leads 402 and 404 of the previously traced circuit through the reversing switch 26 by which energization could be supplied to the operating coil 100 or 110 of either of the power relays 30 or 32, which interruption of such circuit is momentarily redundant to the previously noted interruption thereof provided by the change of state of the relay switch 124 of the control relay 34 upon actuation of the latter, but will be needed when the control relay 34 is deactuated as next described.

The reversal of state of the relay switch 130 of the now actuated control relay 36 has two consequences. First, the previously traced circuit through the switched path 148 of the timer unit 42 for energizing the operating coil 122 of the control relay 34 is interrupted between leads 504 and 506 to deenergize the operating coil 122, deactuate the control relay 34, and restore the relay switches 124 and 126 associated with the latter to their normal states illustrated in the drawing.

Secondly, the change of state of the relay switch 130 of the control relay 36 establishes a holding circuit for continuing the trigger energization being supplied to the control terminal 178 of the timer unit 44, which is traceable from the power extension lead 400 through the closed switch 72 of the start switch assembly 16, lead 500, closed relay switch 98 of the master relay 28, lead 502, lead 504, the now closed contacts of the relay switch 130 of the control relay 36, lead 800, and lead 700 to the control terminal 178 of the timer unit 44.

When the predetermined interval of time established by the resistance 164 associated with the timer unit 44 has elapsed, the timing and control means 166 will reopen the switched path 166 of the timer unit 44, thereby interrupting the path to ground portion of the previously traced energizing circuit for the operating coil 126 of the control relay 136 and causing the latter to deactuate with consequent restoration of its associated relay switches 128 and 130 to the normal states thereof illustrated in the drawing.

Such restoration of the relay switch 128 to its normal state upon deactuation of the control relay 136 will restore the continuity of the previously traced circuit for energizing the operating coil 100 of the power relay 30 (or the operating coil 110 of the power relay 32, as the case may be), a portion of such circuit being retraced for convenience as running from the power extension lead 400, through the normally closed contacts of the relay switch 124 of the control relay 34, lead 402, the reclosed relay switch 128 of the control relay 36, lead 404 to the reversing switch 26, and thence to the operating coil of the appropriate power relay 30 in this instance (or 32, as the case may be). Such energization of the operating coil 100 actuates the power relay 30 and alters the state of each of the switches 102, 104, 106, 108 and 109 associated therewith. Such closing of power relay switches 102, 104 and 106 again energizes the motor 46 for active operation thereof, in the opposite direction from the last previous active operation of same, through the circuitry previously traced; the closing of relay switch 109 causes concurrent energization of the solenoid 80 and opening of the high flow rate water valve 22 through essentially the same circuit path as previously traced for actuation of the power relay 32 and closure of its switch 119; and opening of the relay switch 108 interrupts the circuit path initially employed for actuating the timer unit 40.

The concurrent changing of the state of the relay switch 130 upon actuation of the control relay 36 interrupts the holding path for the control terminal 178 of the timer unit 44 through the lead 800, but, more significantly, also automatically applies another triggering signal to the control terminal 162 of the timer unit 42 along a circuit path traceable from the power extension lead 400, through closed switch 72 of the start switch assembly 16, lead 500, closed relay switch 98 of the master relay 28, lead 502, lead 504, the reclosed contacts of the relay switch 130 of the control relay 36 and leads 506 and 508 to the control terminal 162 of the timer unit 42. Such retriggering of the timer unit 42 results in its timing and control means 160 again immediately reopening the switched path 148 of such unit 42, followed by the maintenance of such switched path 148 in open condition for the predetermined period of desired active operation of the motor 46 and the mechanism 52 of the disposer unit 12 and the high flow rate water valve 22 during the next phase of the automatic operating cycle of the system 10, which period (say, 5 minutes) will again be controlled by the setting or value of the resistance 154 associated with the timer unit 42.

At this point, it will be recognized by those skilled in the art that the automatic cycling of operation of the system 10 has arrived back at a condition essentially the same as that previously described as resulting from initial actuation of the start switch assembly 16, except for the fact that control of energization of the motor 46 and the high flow rate water valve solenoid 80 is being exercised through the power relay 30, rather than the power relay 32. Since it will also be understood that during each successive sequence of an active operating period and an inactive resource conserving interval of the operating cycle, the operating coil 92 will be energized by actuation of the control relay 34 to actuate the reversing switch 26 for successively alternating between the power relays 30 and 32 to reverse the direction of operation of the motor 46 and 52 during each successive period of active opertion thereof, it should now be apparent that the system 10 will simply continue to cycle itself through the operational steps already described until either the main circuit breaker 14 or the stop switch 18 is manually reopened.

At the close of the operating day, the main circuit breaker 14 will be manually reopened, which cuts off all electrical power from the system 10 and restores the latter to the off condition initially herein described and as illustrated in the accompanying drawing. If for any reason during the business day of the establishment in which the system 10 is installed it should be desired to deactivate the system 10, this may be done by simply briefly manually opening the stop switch 18, which will result inter alia in deactuation of the master relay 28 and, more generally, in restoration of the entire system 10 to its off or standby condition illustrated in the drawing, regardless of the phase of automatically controlled operation that it may have been in at the time the stop switch 18 was opened; thereafter, resumption of automatic operation of the system 10 will require a manual actuation of the start switch assembly 16, which will then result in the series of steps previously described as the system 10 restarts its automatically cycled mode of operation.

It should also be observed that, if for any reason such as during servicing or maintenance, it should be desired to restart the system 10 at the initial phase of its normal operating cycle, this can be done simply by manually reactuating the start switch assembly 16. Since such a restart of the system 10 will always commence with a period of active operation of the motor 46 and mechanism 52, as well as opening of the high flow rate water valve 22, such a restarting procedure could be initiated by management personnel at the installation in the event of an unusual build-up of waste materials at the disposer unit 12, so that the active operating period of the disposer unit 12 would effectively be extended, if the system 10 had already been in an active operating period of its cycle of operation, or in substituting an immediate phase of active operation for what otherwise would have been the remainder of a particular inactive resource conserving phase of the normal cycle of operation. In any case, however, once the system 10 is started or restarted by manipulation of the start switch assembly 16, it will thereafter automatically cycle through the phases of normal operation hereinabove described until manually placed in its off condition by opening of the main circuit breaker 14 or the stop switch 18.

It should now be appreciated that my invention fully achieves its stated objectives and other advantages, and does so through the utilization of an effective arrangement of reliable components that are readily available. It should be equally apparent, however, that various minor modifications could be made to the details of construction of the particular, currently preferred embodiment described hereinabove for illustrative purposes, without departing from the real spirit or essence of the invention. Accordingly, it is to be understood that the invention should be construed as extending to the subject matter defined by the claims which follow and mechanical equivalents thereof.

I claim:

1. In a disposal system for waste food materials or the like having:

disposer means, including inlet means adapted for receiving waste materials and water, shiftable comminuting means adapted when shifted for comminuting said materials in the presence of said water, electric motor means operably coupled with said comminuting means and adapted when electrically energized for operating to shift said comminuting means, and outlet means adapted for discharging said water and said materials comminuted by said comminuting means to a sewer or the like;

water supply means for supplying water to said disposer means for lubricating, flushing and cooling the latter, including first valve means having open and closed states, adapted when in said open state thereof for permitting flow of water at a first predetermined rate from a source thereof to said inlet means and adapted when in said closed state thereof for blocking said flow of water at said first rate, and first electrically responsive valve operating means operably coupled with said first valve means, having first and second states of actuation dependent upon the condition of absence or presence of electrical energization applied thereto, adapted when in said first state of actuation thereof for placing said first valve means in said closed state of the latter and adapted when in said second state thereof for placing said first valve means in said open state of the latter; and power controlling means for influencing the energization states of said disposer means and said water supply means, including motor switching means having open and closed states, adapted for being electrically coupled in series between said motor means and a source of electrical energizing power for the latter, adapted when in said open state thereof for deenergizing said motor means and adapted when in said closed state thereof for electrically coupling said motor means with said source of electrical energizing power therefor, valve switching means having open and closed states, adapted for being electrically coupled in series between said first valve operating means and a source of electrical energizing power for the latter, adapted when in said open state thereof for placing said first valve operating means in said first state of actuation of the latter to close said first valve means and adapted when in said closed state thereof for placing said first valve operating means in said second state of actuation thereof to open said first valve means, and first electrically responsive motor and valve control means operably coupled with said motor switching means and said valve switching means, having first and second states of actuation dependent upon the condition of absence or presence of electrical energization applied thereto, adapted when in said first state of actuation thereof for placing said motor switching means and said valve switching means in said open states of the latter to deactivate said motor means and close said first valve means and adapted when in said second state of actuation thereof for placing said motor switching means and said valve switching means in said closed states of the latter to operate said motor means and open said first valve means;

improved means for the coordinated control of said disposer means, said water supply means and said power controlling means, including:

first timed switching means, including first switched path means having open and closed states, and first electrically responsive timing and controlling means operably coupled with said first switching path means, provided with first control terminal means and adapted when an electrical triggering signal is applied to said first control terminal means while said first switched path means is in said closed state thereof comprising its normal standby state for placing said first switched path means in said open state thereof for a predetermined period of time and then restoring said first switched path to said closed state thereof at the end of said period of time;

second timed switching means, including second switched path means having open and closed states, and second electrically responsive timing and contolling means operably coupled with said second switching path means, provided with second control terminal means and adapted when an electrical triggering signal is applied to said second control terminal means while said second switched path means is in said open state thereof comprising its normal standby state for placing said second switched path means in said closed state thereof for a predetermined interval of time and then restoring said second switched path means to said open state thereof at the end of said interval of time;

first electric control means, including first and second control switch means each having open and closed states, and first electrically responsive actuator means operably coupled with said first and second control switch means, having first and second states of actuation thereof dependent upon the condition of absence or presence of electrical energization applied thereto, adapted when in said first state of actuation thereof comprising its normal standby state for placing said first control switch means in said open state of the latter and said second control switch means in said closed state of the latter and adapted when in said second state of actuation thereof for placing said first control switch means in said closed state of the latter and said second control switch means in said open state of the latter;

second electric control means, including third and fourth control switch means each having open and closed states, and second electrically responsive actuator means operably coupled with said third and fourth control switch means, having first and second states of actuation dependent upon the condition of absence or presence of electrical energization applied thereto, adapted when in said first state of actuation thereof comprising its normal standby state for placing said third control switch means in said closed state of the latter and said fourth control switch means in said closed state of the latter and adapted when in said second state of actuation thereof for placing said third control switch means in said open state of the latter and said fourth control switch means in said open state of the latter;

first electrical circuit means having said third control switch means in series therewith adapted for electrically coupling said first control terminal means with a source of electrical control power;

second electrical circuit means having said first control switch means in series therewith adapted for electrically coupling said second control terminal means with a source of electrical control power;

third electrical circuit means having said third control switch means and said first switched path means in series therewith adapted for electrically coupling said first actuator means with a source of electrical control power;

fourth electrical circuit means having said second switched path means in series therewith adapted for electrically coupling said second actuator means with a source of electrical control power; and fifth electrical circuit means having said second and fourth control switch means in series therewith adapted for electrically coupling said first motor and valve control means with a source of electrical control power.

2. In a disposal system as set forth in claim 1, wherein:
said first and second timing and control means are electronic in character and are devoid of moving mechanical parts, and
each of said first and second timing and controlling means is provided with an electrical resistance electrically coupled therewith for controlling the lengths of said period and said interval respectively.

3. In a disposal system as set forth in claim 2, wherein:
said resistances are each variable independently of each other.

4. In a disposal system as set forth in claim 1, wherein:
said interval is longer than said period.

5. In a disposal system as set forth in claim 1, wherein:
said source of electrical energizing power for said motor means provides 3-phase, alternating current, electric power,
said motor means comprises a 3-phase, alternating current, electric motor, and
said source of electrical control power provides single-phase, alternating current, electric power.

6. In a disposal system as set forth in claim 1, wherein:
there is provided master control means, including first and second master switch means each having open and closed states, and electrically responsive activating means operably coupled with said first and second master switch means, having first and second states of actuation thereof dependent upon the condition of absence or presence of electrical energization applied thereto, adapted when in said first state of actuation thereof comprising its normal standby state for placing said first master switch means in said open state of the latter and said second master switch means in said open state of the latter and adapted when in said second state of actuation thereof for placing said first master switch means in said closed state of the latter and said second master switch means in said closed state of the latter;

there is provided start switch means, including a normally open starter switch having a closed state during actuation of said start switch means;

there is provided sixth electrical circuit means having said starter switch in series therewith adapted for electrically coupling said activating means of said master control means with a source of electrical control power;

there is provided seventh electrical circuit means having said first master switch means in series therewith adapted for electrically coupling said activating means of said master control means with a source of electrical control power; and said second master switch means is electrically coupled in series with each of said first, second, third and fourth electrical circuit means.

7. In a disposal system as set forth in claim 1, wherein:

there is provided auxiliary water trickling means, including second valve means having open and closed states, adapted when in said open state thereof for permitting flow of water at a second predetermined rate less than said first predetermined rate from a source thereof to said inlet means and adapted when in said closed state thereof for blocking said flow of water at said second rate, and second electrically responsive valve operating means operably coupled with said auxiliary valve means, having first and second states of actuation dependent upon the condition of absence or presence of electrical energization applied thereto, adapted when in said first state of actuation thereof for placing said auxiliary valve means in said closed state of the latter and adapted when in said second state thereof for placing said auxiliary valve means in said open state of the latter; and there is provided eighth electrical circuit means adapted for electrically coupling said second valve operating means with a source of electrical control power whenever said activating means of said master control means is in said second state of actuation thereof.

8. In a disposal system as set forth in claim 1, wherein:

there is provided third timed switching means, including third switched path means having open and closed states, and third electrically responsive timing and controlling means operably coupled with said third switched path means, provided with third control terminal means and adapted when an electric triggering signal is applied to said third control terminal means while said third switched path means is in said open state thereof comprising its normal standby state for placing said third switched path means in said closed state thereof for a predetermined stretch of time shorter than said period and shorter than said interval and then restoring said third switched path means to said open state thereof at the end of said stretch of time; and there is provided ninth electrical circuit means having said third switched path means in series therewith adapted for electrically coupling said first valve operating means with a source of electrical control power.

9. In a disposal system as set forth in claim 1, wherein:

said comminuting means is rotatable and reversible operable in either direction of rotation thereto;

said electric motor means is reversible and rotatable in either direction depending upon the manner in which same is electrically coupled with a source of electrical energizing power therefor;

said power controlling means further includes alternate motor switching structure having open and closed states, adapted for being electrically coupled in series between said motor means and a source of electrical energizing power for the latter, adapted when in said open state thereof for deenergizing said motor means and adapted when in said closed state thereof for electrically coupling said motor means with said source of electrical energizing power therefor in a manner different from that in which said motor switching means may electrically couple said motor means with said source of electrical energizing power therefor, valve switching structure having open and closed states, adapted for being electrically coupled in series between said first valve operating means and a source of electrical energizing power for the latter, adapted when in said open state thereof for placing said first valve operating means in said first state of actuation of the latter to close said first valve means and adapted when in said closed state thereof for placing said first valve operating means in said second state of actuation thereof to open said first valve means, and second electrically responsive motor and valve control means operably coupled with said motor switching structure and said valve switching structure, having first and second states of actuation dependent upon the condition of absence or presence of electrical energization applied thereto, adapted when in said first state of actuation thereof for placing said motor switching structure and said valve switching structure in said open states of the latter to deactivate said motor means and close said first valve means and adapted when in said second state of actuation thereof for placing said motor switching structure and said valve switching structure in said closed states of the latter to operate said motor means in a reversed direction and to open said first valve means;

there is provided motor reversing control means, including reversing switch means having a common contactor part and a pair of contact parts adapted to be alternately contacted by said contactor part, and electrically responsive operating means operably coupled with said reversing switch means, having first and second states of actuation thereof dependent upon the condition of presence of electrical energization applied thereto and adapted upon each successive operation thereof from said first to said second states of actuation thereof for shifting said contactor part alternately into contact with that one of said contact parts other than the one which had theretofore been contacted by said contactor part;

there is provided tenth electrical circuit means adapted for electricallt coupling said motor and valve control means with one of said contact parts;

there is provided eleventh electrical circuit means for electrically coupling said motor and valve control structure with the other of said contact parts; and there is provided twelfth electrical circuit means having said second and said fourth control switch means in series therewith adapted for electrically coupling said contactor part with a source of electrical control power.

* * * * *